Aug. 11, 1931.  L. F. LAMPLOUGH  1,818,560
DEVICE FOR JOINING ARTICLES
Filed Dec. 4, 1928

Inventor
Leslie F. Lamplough
By

Patented Aug. 11, 1931

1,818,560

UNITED STATES PATENT OFFICE

LESLIE FAWCETT LAMPLOUGH, OF CHICAGO, ILLINOIS, ASSIGNOR TO WESTERN ELECTRIC COMPANY, INCORPORATED, OF NEW YORK, N. Y., A CORPORATION OF NEW YORK

DEVICE FOR JOINING ARTICLES

Application filed December 4, 1928. Serial No. 323,596.

This invention relates generally to devices for joining articles, and more particularly to devices for splicing wires.

The objects of the invention are to provide simple and effective devices for joining articles by means of which articles may be rapidly, uniformly and securely joined.

In accordance with the general features of the invention, as embodied in one specific device by means of which a method embodying the invention may be practiced, there is provided a stationary jaw having a toothed gripping surface thereon, the central tooth of which extends beyond the other teeth, and a support is provided adjacent the stationary jaw for holding a tubular splicing sleeve. A movable jaw having an opening therein is provided adjacent the stationary jaw and the support and a cam having suitable operating means associated therewith extends into the opening in the movable jaw to effect movement thereof. The movable jaw is also provided with a toothed surface for gripping the splicing sleeve, and means are provided for yieldably retaining this jaw in contact with the sleeve to hold the latter in a desired position.

Other objects and features of the invention will be evident from the following detailed description of a specific embodiment thereof, taken in connection with the accompanying drawings, in which Fig. 1 is a plan view of a splicing device by means of which the method embodying the invention may be practiced;

Figure 1:
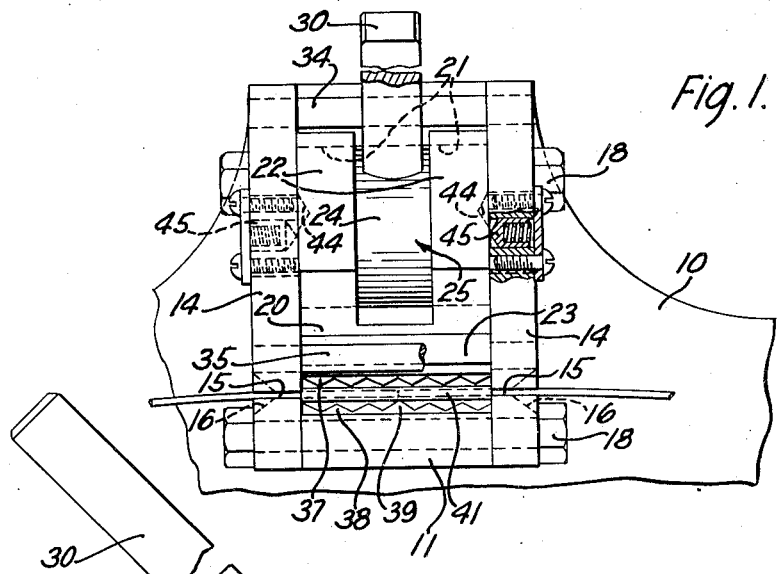

Referring now to the drawings, the numeral 10 designates a base upon which an L-shaped block 11 having an upwardly extending jaw portion 13 is positioned by means of bolts 12—12 and uprights 14—14 having notches 15—15 and funnel-shaped depressions 16—16 intersecting the slots 15—15 formed therein are secured upon opposite sides of the block 11 by means of bolts 18—18. Positioned between the uprights 14—14 is a bifurcated member 20 which is provided with a horizontally disposed jaw portion 23 having aligned circular openings 21—21 formed in the arm portions 22—22 thereof, into which openings a central cylindrical portion 24 of a cam 25 extends. The cam 25 has aligned cylindrical end portions 26—26 formed thereon eccentrically of the cylindrical central portion 24, which end portions extend into openings 27—27 formed in the uprights 14—14 which act as bearings for the cam. An operating handle 30 extends into an opening 31 formed in the central cylindrical portion of the cam 25 and is secured therein by means of a set screw 32 so that when the handle 30 is actuated the cam 25 is rotated and motion is imparted to the member 20, pins 34 and 35 which extend between the uprights 14—14 serving to limit the motion of the members.

A toothed insert 37 is positioned in the jaw portion 23 of the member 20 adjacent the slots 15—15 in the uprights 14—14 and a companion toothed insert 38 is positioned in the jaw portion 13 of the block 11 opposite the insert in the member 20, the central tooth 39 of which protrudes beyond the other teeth forming a part of the insert 38 so as to initially contact with and initially deform a tubular splicing sleeve 41, which may be positioned between the inserts 37 and 38 and supported upon a shoulder 42 formed on the block 11. Each of the arms 22—22 of the bifurcated member 20 is provided with an indentation 44 into which spring pressed plungers 45—45 mounted in the uprights 14—14 may extend to yieldably retain the member 20 in the position assumed by this member when the tubular splicing sleeve positioned between the toothed inserts 37 and 38 has just been initially deformed by the protruding tooth 39 of the insert 38.

Figure 2:
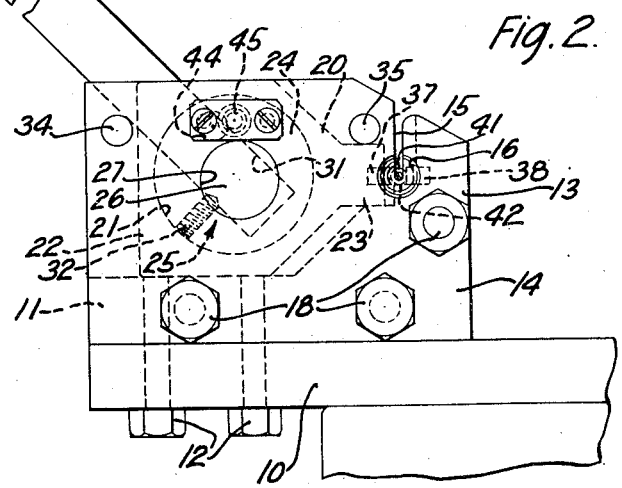
Fig. 2 is a side view thereof.
Figure 3:
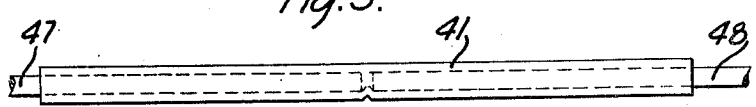
Fig. 3 is an enlarged view of a partially formed splice formed by means of the splicing device.
Figure 4:
Fig. 4 is an enlarged view of a completely formed splice.

The operation of the device is as follows: The handle 30 is moved into the position shown in Fig. 2, a splicing sleeve such as that indicated by the numeral 41 is placed between the inserts 37 and 38 so as to rest upon the shoulder 42, and the handle 30 is actuated in a clockwise direction as viewed in Fig. 2 until the spring pressed plungers 45—45 engage the depressions 44—44 in the arms 22—22 of the member 20, at which time the central portion of the splicing sleeve 41 has just been initially deformed by the protruding tooth 39 of the insert 38 in the manner shown in detail in Fig. 3. In this operation the sleeve 41 is gripped by the inserts 37 and 38 and thereby held against displacement, and a dent is formed substantially in the center of the splicing sleeve 41 which acts as a stop against which the ends of wires 47 and 48 to be spliced may be brought to position the ends equally within the splicing sleeve 41. After the ends of the wires to be spliced have been inserted within the initially formed splicing sleeve, the handle 30 is advanced still further in a clockwise direction, as seen in Fig. 2, until the member 20 abuts the pin 35 during which motion the splicing sleeve and the portions of the wires 47 and 48 positioned therein are deformed or crimped in the manner shown in detail in Fig. 4, so that the wires are joined by means of the splicing sleeve 41.

It will be readily apparent that since the cylindrical end portions 26—26 of the cam 25 are rotatably mounted in the uprights 14—14 and are formed eccentrically of the central cylindrical portion 24 of the cam, the cam will exert force upon the member 20 when the cam is actuated by means of the handle 30 and will cause the member 20 to reciprocate in a horizontal direction, and thereby effect relative movement between the inserts 37 and 38. To assist in the insertion of wires within the splicing sleeve positioned upon the shoulder 42 and in the withdrawal of spliced wires from the device, the uprights 14—14 are provided with slots 15—15 and funnel-shaped depressions 16—16, through which the wires may be readily advanced.

Although a specific embodiment of the invention, by means of which wires of circular cross-section may be spliced, has been described, it is of course to be understood that the invention is not limited to this specific structure, but that wires and various other articles of different cross-sections may be joined by utilizing a device embodying the invention.

What is claimed is:

1. In a splicing device, a pair of jaws, means for effecting relative movements between the jaws, means for supporting a splicing sleeve between the jaws, means for initially deforming a portion of said splicing sleeve to assist in positioning therein members to be joined thereby and cooperating means upon the jaws for crimping the sleeve, the initial deforming and crimping means both being operative during a single uni-direction movement between the jaws.

2. In a splicing device, a pair of jaws, means for effecting relative movement between the jaws, means for supporting a tubular splicing sleeve between the jaws, a toothed insert mounted in one of the jaws for crimping a splicing sleeve, the central tooth of which insert protrudes beyond the other teeth and initially deforms a portion of the sleeve when the jaws are moved toward a closed position, and means for yieldably retaining the jaws in the position assumed when the splicing sleeve has been initially deformed by the protruding tooth.

3. In a splicing device, a stationary jaw, a movable jaw, means for supporting a tubular splicing sleeve between the jaw, toothed inserts in the jaws for deforming a splicing sleeve positioned therebetween, the central tooth of one of the inserts protruding beyond the remaining teeth to initially deform the sleeve when the movable jaw is advanced toward the stationary jaw, and means for yieldably retaining the movable jaw in the position assumed when the splicing sleeve has been initially deformed by the protruding tooth.

4. In a splicing device, a stationary jaw having a toothed gripping surface thereon, a bifurcated movable jaw having a toothed gripping surface thereon and having a circular opening in each of its arms, supports adjacent the movable jaw, a cam having a cylindrical portion extending into the openings in the movable jaw and movably mounted on the supports eccentrically of said openings, and means for actuating the cam whereby motion is imparted to the movable jaw.

5. In a splicing device, a stationary member, a bifurcated movable member having a circular opening in each of its arms, supports adjacent the arms of the movable member, a cam having a cylindrical portion extending into the openings in the movable member and movably mounted on the supports eccentrically of said openings, means for actuating the cam whereby motion is imparted to the movable member, means for supporting a splicing sleeve between the stationary and movable members, and toothed inserts adjacent the stationary and movable members for deforming a splicing sleeve positioned therebetween.

6. In a splicing device, a stationary jaw, a companion bifurcated jaw movable toward and away from the stationary jaw and having aligned circular openings in the arm portions thereof, a cam having a central cylindrical portion extending into the openings in the movable member and having cylindrical end portions formed eccentrically of the central portion thereof, supports adjacent the arms of the movable jaw having openings therein for receiving the end portions of the cam, an operating handle secured to the cam for actuating the same and thereby imparting motion to the movable jaw, means for supporting a splicing sleeve between the jaws, toothed inserts positioned in the jaws for deforming a splicing sleeve positioned therebetween, one of said inserts having a tooth thereof protruding beyond the other tooth for initially deforming the sleeve, and means for yieldably retaining the movable jaw in the position assumed when the splicing sleeve has been initially deformed by the protruding tooth.

7. In a strand splicing device, means for preforming a splicing sleeve to assist in positioning the strands therein, means for completely forming the sleeve to bind the strands therein, an operating lever, and a rotatable cam responsive to a continuous unidirectional movement of the lever for rendering the preforming and forming means effective in sequence.

8. In a strand splicing device, an operating lever, a cam and means actuated by the cam and responsive to a continuous unidirectional movement of the lever for preforming a splicing sleeve to assist in positioning the strands therein and for subsequently completely forming the sleeve to bind the strands therein.

9. In a splicing device, a stationary jaw, a movable jaw having an opening therein, cam means positioned in said opening for effecting movement of the movable jaw, a plurality of teeth on one of the jaws for forming an article and a larger tooth on the other jaw for preforming the article upon operation of the cam means.

10. In a splicing device, a stationary jaw, a movable jaw having a circular opening therein, a cam positioned in said opening, means for actuating the cam whereby motion is imparted to the movable jaw, a plurality of teeth on one of the jaws for forming an article and a larger tooth on the other jaw for preforming the article upon actuation of the cam.

11. In a splicing device, a stationary jaw, a companion jaw movable toward and away from the stationary jaw and having a circular opening therein, a support adjacent the jaws, a circular cam mounted upon the support eccentrically of and extending into the opening of the movable jaw for effecting movement thereof, a plurality of teeth on one of the jaws for forming an article and a larger tooth on the other jaw for preforming the article upon movement of the movable jaw toward the stationary jaw.

In witness whereof, I hereunto subscribe my name this 24th day of November, A. D. 1928.

LESLIE FAWCETT LAMPLOUGH.